US011689534B1

(12) United States Patent
Smith

(10) Patent No.: US 11,689,534 B1
(45) Date of Patent: Jun. 27, 2023

(54) DYNAMIC AUTHORIZATION OF USERS FOR DISTRIBUTED SYSTEMS

(71) Applicant: Amazon Technologies, Inc., Seattle, WA (US)

(72) Inventor: Justin W Smith, Broadlands, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/108,590

(22) Filed: Dec. 1, 2020

(51) Int. Cl.
*G06F 3/0482* (2013.01)
*G06F 9/451* (2018.01)
*H04L 9/40* (2022.01)
*G06F 9/54* (2006.01)

(52) U.S. Cl.
CPC .......... *H04L 63/102* (2013.01); *G06F 3/0482* (2013.01); *G06F 9/451* (2018.02); *G06F 9/541* (2013.01)

(58) Field of Classification Search
CPC ..... H04L 63/102; G06F 3/0482; G06F 9/451; G06F 9/541
See application file for complete search history.

(56) References Cited

U.S. PATENT DOCUMENTS

| | | | | |
|---|---|---|---|---|
| 6,014,666 A | * | 1/2000 | Helland | G06F 9/468 |
| 6,023,765 A | * | 2/2000 | Kuhn | G06F 21/6218 |
| | | | | 726/4 |
| 6,985,955 B2 | * | 1/2006 | Gullotta | G06Q 10/06 |
| | | | | 709/229 |
| 7,222,369 B2 | * | 5/2007 | Vering | G06F 21/6218 |
| | | | | 709/226 |
| 7,979,893 B2 | * | 7/2011 | Ontaneda | G06F 21/604 |
| | | | | 726/5 |
| 8,789,205 B2 | * | 7/2014 | Ramaswamy | G06F 3/048 |
| | | | | 726/28 |
| 8,793,489 B2 | * | 7/2014 | Polunin | G06F 21/604 |
| | | | | 713/166 |
| 8,973,087 B2 | * | 3/2015 | Ritt | H04L 63/083 |
| | | | | 726/1 |
| 9,646,145 B2 | * | 5/2017 | Vida | G06F 21/44 |
| 11,107,022 B2 | * | 8/2021 | Dhandapani | H04W 4/024 |
| 2003/0229623 A1 | * | 12/2003 | Chang | G06F 21/6218 |

(Continued)

FOREIGN PATENT DOCUMENTS

EP 2626820 A3 * 10/2016 ............. G06Q 10/06

*Primary Examiner* — Yongjia Pan
(74) *Attorney, Agent, or Firm* — Lee & Hayes, P.C.

(57) ABSTRACT

Technologies are disclosed for dynamic authorization of users for distributed systems. A permission service allows authorized users to specify permissions for users of different systems, such as physical access security systems (PACS) and easier for users to interact with the authorized resources of the PACS. A manager may select a role for the user to specify the allowed permissions for the user. Changing the permissions/resources of a role automatically changes the permissions for users that are associated with the role. A scope may also be assigned to the user that specifies the locations of the physical resources that the user may access (e.g., a particular data center, a region, globally, ... ). Instead of having to locate specific resources that the user is authorized to access, a graphical user interface (GUI) displays the authorized resources. When the resources change, the GUI is dynamically updated.

20 Claims, 9 Drawing Sheets

(56) References Cited

U.S. PATENT DOCUMENTS

| | | | |
|---|---|---|---|
| 2005/0198324 A1* | 9/2005 | Silva | G06F 21/62 709/229 |
| 2005/0262549 A1* | 11/2005 | Ritt | H04L 63/083 726/1 |
| 2006/0037081 A1* | 2/2006 | Moses | G07C 9/32 726/27 |
| 2006/0218394 A1* | 9/2006 | Yang | G06F 21/604 713/167 |
| 2007/0001834 A1* | 1/2007 | Fisher | G06F 21/604 340/506 |
| 2007/0079357 A1* | 4/2007 | Grinstein | G06F 21/629 726/2 |
| 2007/0240231 A1* | 10/2007 | Haswarey | G06F 21/6218 726/28 |
| 2007/0266151 A1* | 11/2007 | Friedland | G06Q 10/10 709/225 |
| 2007/0266330 A1* | 11/2007 | Friedland | G09B 7/00 715/764 |
| 2008/0195544 A1* | 8/2008 | Bartek | G06F 21/6218 705/51 |
| 2009/0157570 A1* | 6/2009 | Pall | G06N 5/00 706/11 |
| 2009/0319923 A1* | 12/2009 | Schaller | G06F 8/38 715/762 |
| 2010/0191554 A1* | 7/2010 | Singh | G06Q 30/02 705/7.11 |
| 2010/0211989 A1* | 8/2010 | Julisch | G06F 21/604 726/1 |
| 2011/0137945 A1* | 6/2011 | Sandblom | G06F 30/13 707/783 |
| 2011/0213789 A1* | 9/2011 | Doshi | G06F 21/6218 707/754 |
| 2011/0265188 A1* | 10/2011 | Ramaswamy | G06F 21/6218 715/764 |
| 2011/0277017 A1* | 11/2011 | Ivanov | H04L 63/105 726/4 |
| 2013/0212703 A1* | 8/2013 | Ramesh | G06Q 10/06393 726/28 |
| 2014/0122538 A1* | 5/2014 | Peterson | G06F 3/0484 707/805 |
| 2014/0157350 A1* | 6/2014 | Wang | G06F 21/6218 726/1 |
| 2015/0105878 A1* | 4/2015 | Jones | G06F 9/44505 700/83 |
| 2016/0266733 A1* | 9/2016 | Alon | G06F 3/0484 |
| 2017/0093871 A1* | 3/2017 | Abuelsaad | H04L 63/101 |
| 2018/0259934 A1* | 9/2018 | Piaskowski | G05B 15/02 |
| 2019/0230088 A1* | 7/2019 | Rice | G06F 21/604 |
| 2020/0053091 A1* | 2/2020 | Childress | G06F 9/451 |
| 2022/0103566 A1* | 3/2022 | Faulkner | H04L 67/535 |

* cited by examiner

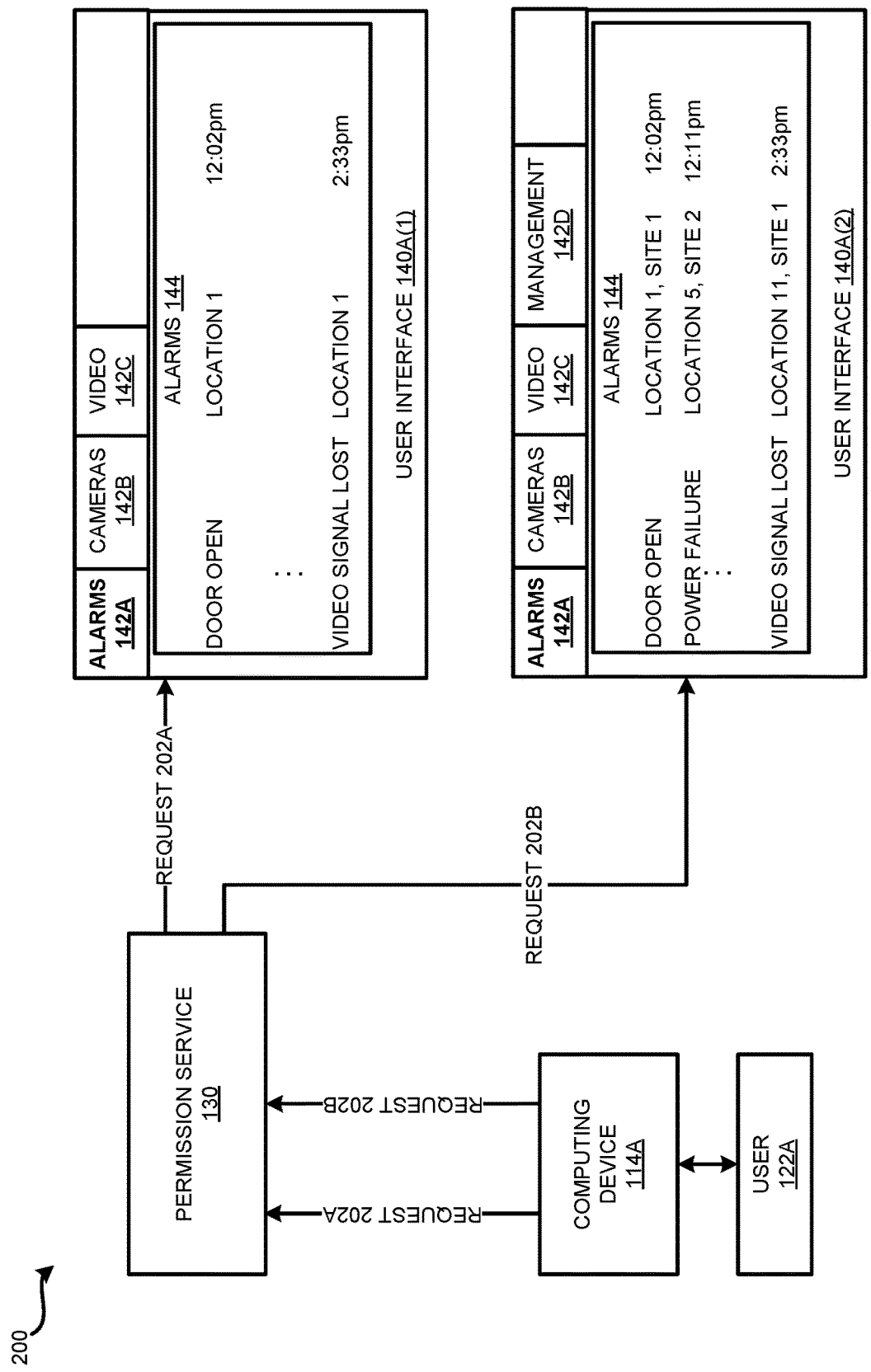

DYNAMIC AUTHORIZATION OF USERS FOR DISTRIBUTED SYSTEMS

BACKGROUND

Providing security mechanisms for physical systems can be very challenging. In some organizations, authorized users interact with access control systems, such as a physical access control system (PACS), to define permissions for different users. In some instances, using different PACS tools, authorized users may specify what permissions a user has for different systems. For example, an administrator using a PACS tool may configure permissions for a user to view images received from security cameras. The same administrator, or another administrator, may use another PACS tool to set permissions that specify what buildings/rooms the user may enter. In some cases, the administrators may spend a lot of time searching for the resources that the user is authorized to access. Making this process take even longer, is that in many cases, very few users may be authorized to make changes to permissions. As an example, there may be thousands of users to manage, but only a small team of authorized users (e.g., administrators) that are authorized to make changes. As such, it may be very time-consuming and resource intensive (e.g., processing power, increased memory usage, etc.) to specify permissions for a user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a software and network architecture diagram showing aspects of a permission service that dynamically authorizes users of distributed systems.

DETAILED DESCRIPTION

Figure 1:
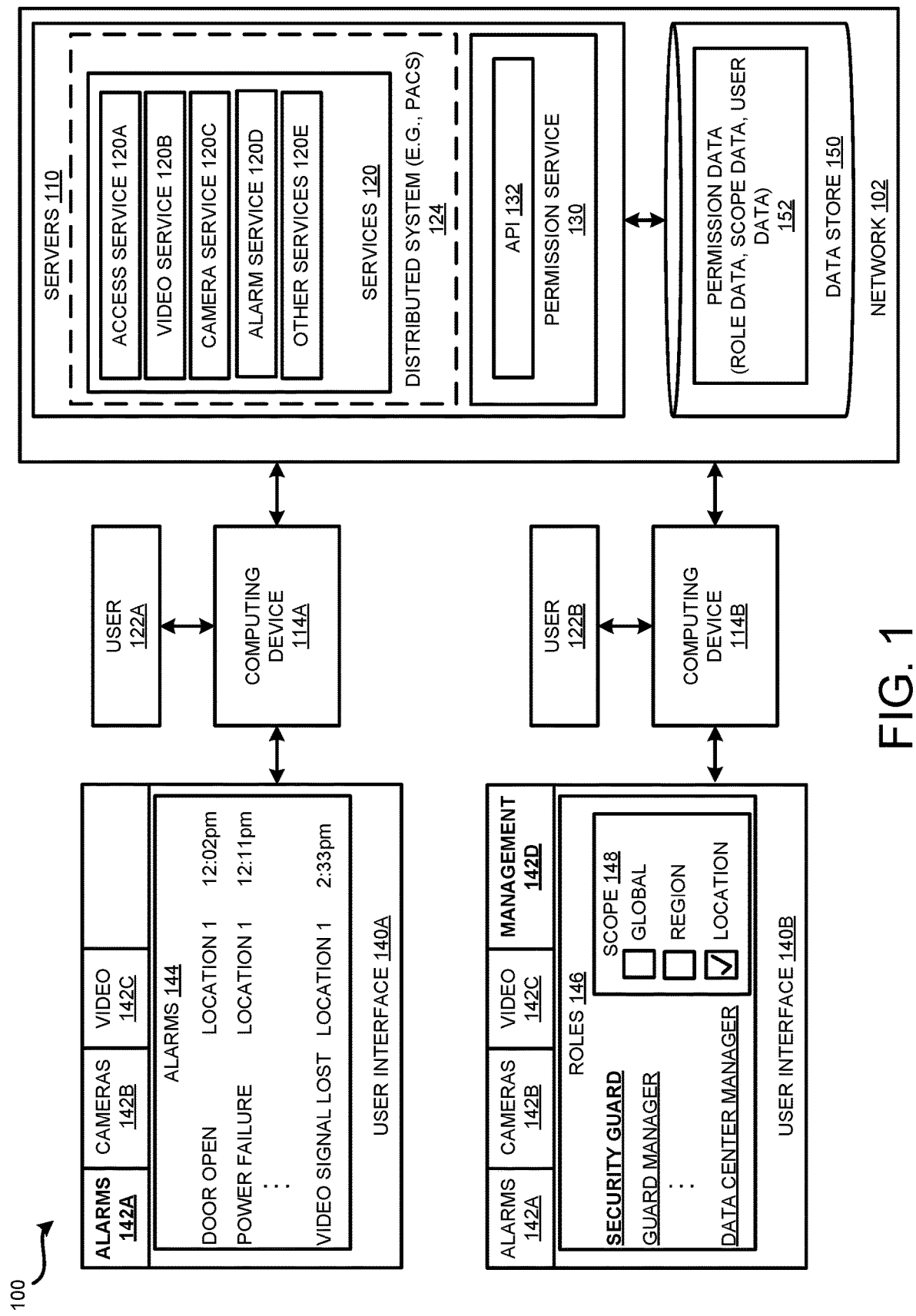
FIG. 1 is a software and network architecture diagram showing aspects of the configuration and utilization of an environment for dynamic authorization of users for distributed systems.

The following detailed description is directed to technologies for dynamic authorization of users for distributed systems. As used herein, a "distributed system" is a system that includes different computing devices that communicate and coordinate in order to perform different actions. In some configurations, the distributed system includes different services configured to perform different PACS functionality and/or other operations related to the operation of a Security Operations Center (SOC). For instance, the distributed system may include an alarm management service, a video service, a camera service, an access approval service, an events service, and the like.

Utilizing technologies described herein, a permission service makes it easier for authorized users to configure permissions for users of distributed systems. The permission service also makes it easier for a user to interact with the resources for which they have been authorized. As used herein, a "resource" is any physical component or non-physical component that may be accessed within a system. For example, resources of a Security Operations Center (SOC) may include resources related to security monitoring and detection, such as but not limited to door sensors, window sensors, movement sensors, heat sensors, cameras, access management devices, locks, user authentication devices, software, and the like. Instead of a user having to rely on a variety of different PACS tools that can be expensive and difficult to use, a user of a permissions system may interact with resources that the user is authorized to interact with. As an example, an authorized user, such as a manager, may configure the permissions of a user by simply selecting a role for the user.

As used herein a "role" includes a grouping of operations that authorizes a particular job and/or group of users to access resources. As an example, different roles may be associated with the different jobs for a SOC. For instance, a SOC may have a role for security analysts (e.g., security guards) that respond to incidents, security engineers that assist in designing security systems, SOC managers that manages one or more other security personnel, and the like.

Generally, a role identifies the operations that a user performs to complete the duties of their job. As an example, a manager may select a "security guard role" when onboarding a security guard. Upon selecting the "security guard role", the permission service dynamically sets the permissions such that the user can access the resources identified by the security guard role. In this way, a new security guard may access the resources (e.g., view certain alarms, view camera feeds, access messages, . . . ) used while performing as a security guard. Other roles include different operations for interacting with the resources authorized for that job/group of users. For instance, an SOC manager role may identify that the user may view the alarms and cameras, view archived data from the alarms and cameras, set parameters of the alarms and cameras, perform management functions (e.g., define/change roles, onboard users), and the like.

In some configurations, a manager may also easily change the role for a user (e.g., adding a new resource to a role, removing a resource from a role). For instance, a manager may associate the user with another role, remove a role, change a scope of where the user is authorized to access the resources identified by the authorized operations. When the manager changes the role, the permission service dynamically updates the permissions of the affected users. In this way, a manager, or some other authorized user, does not need to manually change permissions for every individual user in order to provide access to authorized resources. In some configurations, an authorized user may also change the operations associated with a role. For example, the authorized user may add an operation (e.g., to view and/or interact with resources of the distributed system).

According to some examples, an authorized user, such as a manager, may also assign a scope to one or more roles of the user. As used herein, a "scope" identifies locations of the physical resources that the user may access (e.g., a particular room/building/or some other location, a data center, a region, globally, . . . ). Using the permission service as described herein allows users to focus on their work, instead of spending time determining what actions a user can perform.

The permission service also makes it easier for users to interact with the different PACS. Instead of having to locate specific resources that the user is authorized to access, a graphical user interface (GUI) may be displayed to the user that includes dynamically selected user interface (UI) elements that are associated with the resources that the user is authorized to access. In this way, the user may easily access the resources they are authorized to interact with. When the resources a user is authorized to access change (e.g., based on a change of roles, a change of a particular role/scope, some other change to the permissions, a resource is added/removed from a location) the GUI is dynamically updated by the permission service to reflect the currently authorized resources. In some examples, the GUI can be updated during a session the user is viewing the GUI. For instance, the permission service may change the UI elements displayed to the user during the session if the role/scope changes during the session.

In some examples, authorized users can associate roles with users, change scopes associated with the roles, using UI elements presented within the GUI. In some configurations, the permission service may automatically assign new users (e.g., a new hire) based on an initially identified role of the user. In this way, the new hire does not need to wait for another user to configure permissions for them to begin performing the operations of their job.

According to some examples, the GUI also includes functionality that allows authorized users the ability to delegate approval responsibilities to other users, such as users that are at a lower security level than the authorized user. For instance, a manager that is globally authorized may delegate responsibilities to a national administrator, a regional administrator, a site administrator, and the like. In some instances, the GUI may also be used to search for and bulk edit users through attribute-based filtering. Additionally, the permission service may include a reporting and auditing dashboard that allows authorized users to run reports for auditing and compliance needs.

As another example, a manager of a data center may define roles for employees of the data center and then associate the roles with the employees based on their job duties. In some examples, the manager may select a group of employees to associate with a role and/or scope. For instance, the manager may select all of the security guards for a data center and assign them the security guard role for the data center. Instead of the manager having to search for resources to associate with each employee, and manually identify resources that the employee is authorized to access and then manually configure the permissions for those resources, the manager may simply select a role for the employee(s). Instead of spending ten or more minutes manually adding a user to a single security system and specifying permissions for that individual user, a user may be added to one or more security systems with just a few selections (e.g., specifying a role and possibly a scope). If the manager wants to change resources that are authorized to be used by a user, they may simply select a different/additional role. In some examples, an authorized user may edit the operations of a role. For example, the authorized user may add an operation that allows users associated with a particular role to access one or more resources (e.g., add an operation to view live video). In this way, when the role is modified, the manager does not need to manually change the permissions for every employee.

Using techniques described herein, there is no need to ask customers to request a user onboarding through tickets and manually adding individuals. In this way, using the permission service to configure permissions, and view and interact with authorized resources many steps that may be time consuming, error prone, are removed. Additionally, computing resources are more efficiently used as processing may be eliminated or reduced due at least in part a reduction in the number of queries to determine authorized resources of a user network, as well as a reduction of memory to store permissions for a user. Latency is also reduced as the resources that a user is authorized to access is more quickly determined. Additional details regarding the various components and processes described briefly above for dynamic authorization of users for distributed systems will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization of an environment 100 for dynamic authorization of users for distributed systems. It is to be appreciated that the environment 100 is merely illustrative and that the various configurations disclosed herein can be utilized in many different types of computing environments.

To provide a permission service 130 and the other functionality disclosed herein, one or more networks 102 may include one or more servers 110. The servers 110 can execute software components to provide the services described herein, including the permission service 130, functionality and different available services 120 provided by a service provider and/or some other entity. In some examples, the available services 120 include services related to different PACS, such as but not limited to an access management service 120A, a video surveillance service 120B, a camera service 120C, an alarm service 120D, and/or other services 120E. The software components can execute on a single server 110 or in parallel across multiple servers in the networks 102. In addition, a software component can consist of subcomponents executing on different servers 110 or other computing devices in the networks 102. Various components can be implemented as software, hardware, or any combination of the two. In this regard, it is to be appreciated that the networks 102 shown in FIG. 1 has been simplified for discussion purposes and that many additional software and hardware components can be utilized.

A user 122A of the network 102 can utilize the permission service 130, via a computing device 114A, or some other input device. A user 122B of the network 102 can utilize the permission service 130, via a computing device 114B, or some other input device. According to some configurations, the computing devices 114 may be configured to understand natural language voice commands and complete tasks for the user, such as tasks related to replication as described herein. As illustrated, a user 122 may interact with the permission service 130 through a user interface 140. In some examples, the user 122A has been authorized to interact with various resources based on an assigned role, and the user 122B is an authorized user (e.g., a manager) that has been authorized to interact with various resources based on an assigned role that includes management functions relating to associating roles with users and adjusting other parameters relating to one or more resources.

The computing device 114 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, a telephone, a telephone conferencing device, video conferencing device, or any other type of computing device capable of connecting to the network 102 and in some examples, other networks. In other configurations, the computing device 114 may be configured to communicate with one or more other devices to receive commands from users and/or perform processing related to functionality of the network 102.

As illustrated, the computing device 114, or some other device or component, may couple with a network, such as network 102. A network represents an array or wired networks, wireless networks (e.g., Wi-Fi), or combinations thereof. A network may generally refer to a network-accessible platform implemented as a computing infrastructure of processors, storage, software, data access, and so forth. In some examples, a network may be accessible via a network, such as the Internet. These services may not require end-user knowledge of the physical location and configuration of the system that delivers the services. Common expressions associated with these remote services, such as the network 102, include "on-demand computing", "software as a service (SaaS)", "platform computing", "network accessible platform", and so forth.

As illustrated, the network 102 may comprise one or more network-accessible resources, such as servers 110. These resources comprise one or more processors and computer-readable storage media executable on the processors. In some configurations, the users 122 may be identified and/or authenticated before interacting with the computing device 114 that is used to access the network 102.

In some examples, a local-area network ("LAN"), a wide-area network ("WAN"), the Internet, or any other networking topology known in the art may connect user devices to a network. The user 122 can use an application (not shown) executing on computing device 114 that provides a user interface 140 to access and utilize the permission service functionality provided by the servers 110. In some examples, the application is a web browser application (not shown). Generally, a web browser application exchanges data with the servers 110 in the networks 102 using the hypertext transfer protocol ("HTTP") over one or more of the networks 102. The application might also be a stand-alone client application configured for communicating with the servers 110.

The application can also utilize any number of communication methods known in the art to communicate with the network 102 and/or the servers 110, including remote procedure calls, SOAP-based web services, remote file access, proprietary client-server architectures, and the like. According to some configurations, the application may provide a user interface 140 that can be utilized by the user 122 to configure settings associated with the permission service 130 and/or the computing device 114. Typically, a user 122 interacts with the computing device 114 using the user interface 140.

As discussed briefly above, a permission service 130 is configured to provide a mechanism for users of a distributed system to interact with resources of different services. In some configurations, the distributed system includes different services 120 configured to perform different PACS functionality and/or other operations related to the operation of a Security Operations Center (SOC). As illustrated, the distributed system may include an access management service 120A, a video surveillance service 120B, a camera service 120C, an alarm service 120D, and/or other services 120E, such as an events service. The access management service 120A is configured to perform operations relating to approving access to users to enter specific physical areas. The video surveillance service 120B is configured to perform operations relating to capturing video of one or more locations. For example, video cameras may be positioned at various locations of a data center, or some other location, to capture video. The camera service 120C is configured to perform operations relating to capturing graphical images of one or more locations. The alarm service 120D is configured to manage alarms associated with one or more locations. Alarms may be triggered in response to a variety of different events, such as but not limited to a door being opened/closed/left open, power lost/restored, a video signal being lost, a camera signal being lost, a movement of a resource, a user entering a location, a user leaving a location, and the like. More or fewer services 120 may be included within the distributed system.

As briefly discussed above, the permission service 130 makes it easier for authorized users to configure permissions for users to access resources of distributed systems. The permission service also makes it easier for a user authorized by the permissions system to interact with the resources for which they have been authorized. Authorized users may easily configure user permissions that authorize the user to access the resources. Instead of an authorized user having to rely on individual tools to interact with each different service 120, the users may use the permission service 130 to interact with the different services 120.

As illustrated in FIG. 1, the user 122B, such as a manager, may use UI 140B to interact with resources. In some examples, instead of showing all of the resources of distributed system that includes one or more services 120, the permission service 130 dynamically updates the UI elements displayed within a UI 140 based on the resources that the user 122 is authorized to access. In this way, the user 122 can readily ascertain what operations they may perform and what resources they may access without having to guess or look at other data displayed within the UI 140 to determine whether or not they are authorized to access the resource. According to some configurations, the permission service 130 determines authorized resources for a user 122 each time a call is made to interact with a resource. When resources and/or permissions change with a role, the permission service 130 dynamically updates the data displayed within the UI 140. For example, when an authorized user changes a role that is associated with the user, the permission service 130 may be configured to identify the resources the user 122 is authorized for based on the changed role and/or scope. In some examples, the permission service 130 may be notified of the change to the role (e.g., via an event generated in response to the permission data 152 being updated) and/or the permission service 130 may automatically recalculate the authorized resources for a user in response to receiving a request from a computing device 114 associated with the user 122. In this way, the manager, or some other authorized user, does not need to manually change permissions and authorized resources for every individual user.

As illustrated, user 122B, is viewing UI 140B that includes a display of UI elements and data that is associated with a selected tab UI element. For instance, the UI 140B includes tab UI elements for alarms 142A, cameras 142B, video 142C, and management 142D. The UI elements and data, however, may be arranged in many different ways. Upon selection of the UI element management 142D, the permission service 130 identifies the authorized resources that the user 122B may access before displaying data within the UI 140B. In the current example, the permission service 130 identifies that the user 122B is authorized to associate roles with users, such as user 122A. As illustrated, the user 122B has selected the security guard role (as indicated by the bolded text) that is authorized to access resources identified by the security guard for one or more locations (e.g., a particular room/building/site, region, and/or global) as indicated by scope 148.

Since different users that have the same job generally use the same resources to perform their job duties, roles provide an easy way for a manager, or some other authorized user 122, to specify permissions for a new user, or a reassigned user. Further, an authorized user 122 may associate more than one role with the user, and associate different scopes to the different roles. In this way, the authorized user may simply select one or more roles to associate with the user in order to define the resources that the user is authorized to access. According to some examples, a user is assigned to a particular role, such that a user can have permission to act within their job role on a diverse amount of resources. For example, a user 122 may be assigned to the grouping of the security guard role with a scope of a particular building resource. In other examples, a user may be assigned to more than one role. For instance, the user 122 may be assigned to the additional role of a security guard manager that has a different scope (e.g., a different site). By assigning a role to a user, an authorized user that is allowed to assign roles does not need to manually locate and configure many different permissions.

As briefly discussed above, a role may be associated with a specific scope (e.g., site, region, . . . ) to restrict operations based on a given scope of ownership. To improve both security and the user's experience, each user's visibility is limited based on their permissions.

As illustrated, the user 122A may view data, determine actions to perform, and the like via a user interface, such as user interface 140A. In some examples, the permission service 130 provides to a user computing device 114A data for display within user interface 140A, such as a graphical user interface ("GUI"). The GUI may display information relating to authorized resources. UI 140A illustrates the user 122A selecting the alarms 142A UI element to view alarms 144 information about alarm resources that user is authorized to access. In the current example, the permission service 130 accesses the permission data 152 to identify the alarm resources and the scope that the user 122A is authorized to access.

According to some examples, the permission service 130 may expose an Application Programming Interface (API) 132. In some configurations, functionality provided by the permission service 130 may be accessed using the API 132 that may be a Web API. The API 132 might be used to request data from one or more data stores such as data store 150, services 120, and/or other applications, and the like. Some exemplary APIs include but are not limited to configuring roles, associating users 122 with roles, identifying resources a user 122 is authorized to access, and the like. In some configurations, the API 132 may be used to scope the authorization of the resources at different levels (e.g., region, site, and at the individual resource level). Some example authorization management APIs that may be used but are not limited to—Grant-Region-Authorization( ) Revoke-Region-Authorization( ) List-Region-Authorization( ) Grant-Site-Authorization( ) Revoke-Site-Authorization( ) List-Site-Authorization( ) Grant-Resource-Authorization( ) Revoke-Resource-Authorization( ) List-Resource-Authorization( ) List-Regions( ) List-Sites( ) List-Resources( ) List-Authorizations( ) Create-Resource( ) Modify-Resource( ) Delete-Resource( ) Create-Site( ) Create-Region( ) List-Regions( ) List-Sites( ) List-Resources( ) Get-Resource( ) and the like In some configurations, the permission service 130 may access other available services 120 to obtain data that may be used by the permission service 130. For example, the permission service 130 may receive data from a service that provides a notification when permission data 152 changes. The permission service 130 may also receive a listing of the resources currently associated with one or more locations. Additional details regarding the various processes described above with regard to FIG. 1 will be provided below with regard to FIGS. 2-8.

FIG. 2 is a software and network architecture diagram showing aspects of a permission service 130 for dynamic authorization of users for distributed systems. It is to be appreciated that the environment 200 is merely illustrative and that the various configurations disclosed herein can be utilized in many different types of computing environments. FIG. 2 is similar to FIG. 1 but provides additional details relating to a user interface dynamically changing a user interface that displays data associated with resources a user is authorized to access.

As illustrated, environment 200 shows a user 122A that has issued a first request 202A to view data associated with resources that the user 122A uses to perform their job duties. In the illustrated example, the user 122A is using a GUI 140A(1) to view the data. In some configurations, as discussed above, the permission service 130 receives the request 202A, and in response to receiving the request, identifies the resources that the user 122A is authorized to access. In some examples, the permission service 130A accesses the permission data 152 in the data store 150 to locate the role(s) associated with the user 122A. The permission data 152 may also identify the scope of the permissions for the user 122A. In the current example, at a time the user 122A issues the request 202A the permission service 130 identifies that the user 122A is associated with a security guard role that is limited to resources at a first location. In some examples, the permission service 130 queries the associated service 120 to identify the specific resources that are associated with the operations of the role. For example, in response to view alarms, the permission service 130 may query the alarm service 120D to determine the alarms at one or more locations. In this way, the roles do not need to be updated to reflect the actual resources that are at each location. Instead, the role may indicate a category name for the resources (e.g., view door alarms, view power failure alarms, . . . ).

At a second time, the user 122A issues a second request 202B to view data associated with resources that the user 122A uses to perform their job duties. In this example, the permission service 130 receives the request 202B, and in response to receiving the request 202B, identifies the resources that the user 122A is currently authorized to access. The permission service 130A accesses the permission data 152 in the data store 150 to locate the role(s) currently associated with the user 122A. At this time, the permission service 130 identifies that the user 122A is now associated with a security guard manager role that includes access to more than location 1. As can be seen by referring to UI 140A(2), the user 122A may now see alarms at locations other than location 1, and also has access to management resources 142D.

The permission service 130 may communicate with one or more other services 120 using one or more APIs, such as API 132 exposed by the permission service 130. In some examples, each service may expose one or more APIs (not shown) that can be used by a service, or some other component or application, to access functionality and/or data provided by the service.

Figure 3A:
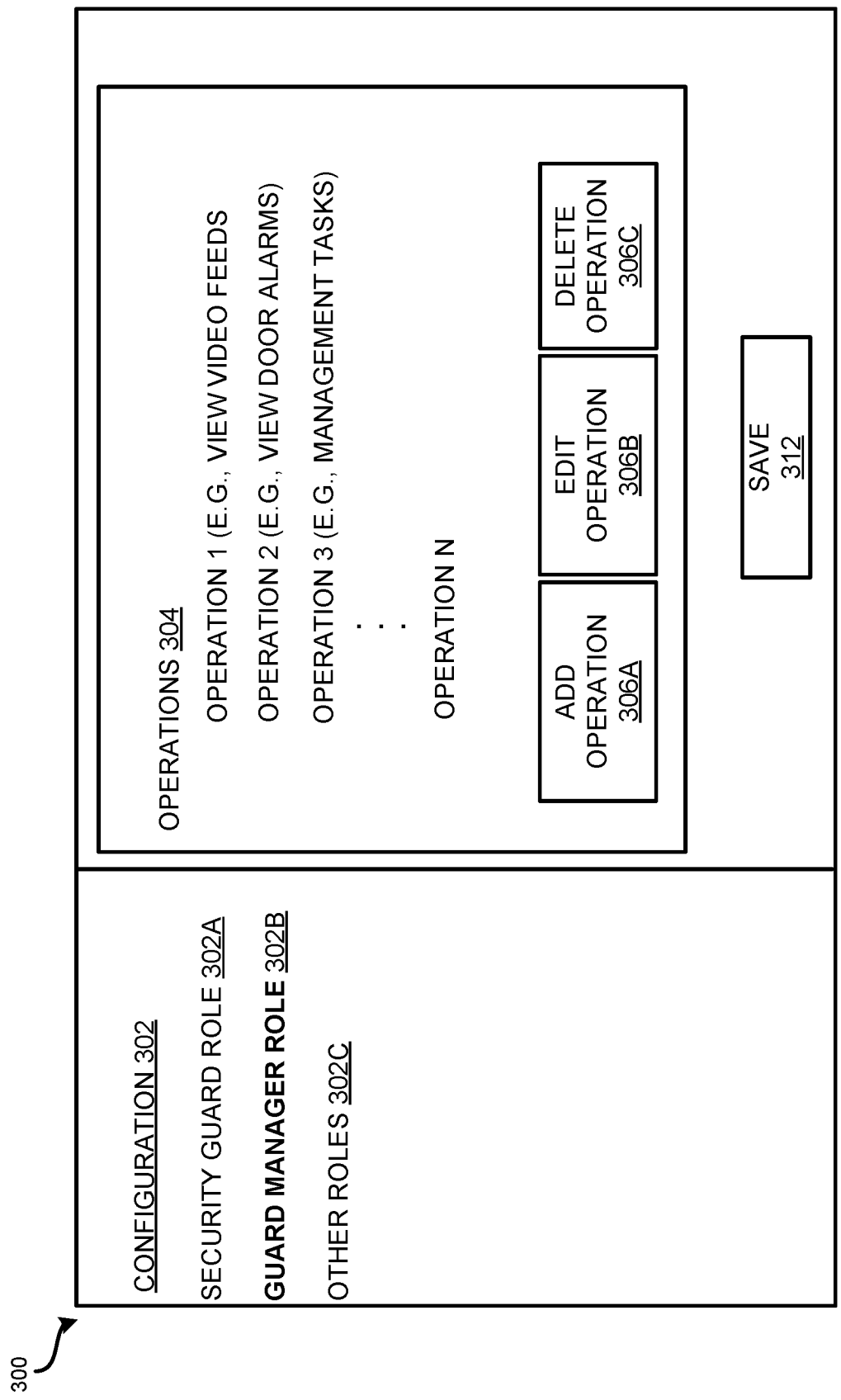
FIG. 3A is a block diagram showing an illustrative graphical user interface that may be utilized to specify operations associated with roles.

FIG. 3A is a block diagram showing an illustrative graphical user interface 300 that may be utilized to specify operations associated with roles. In some examples, the user 122A may view/edit operations 304, that are associated with a particular role via a graphical user interface (GUI). In other examples, the user may use a command line interface, or utilize an Application Programming Interface (API). In some instances, the permission service 130 may provide data for displaying a GUI to a display associated with a user computing device (not shown).

In some examples, authorized users as determined by an associated role can create roles and specify operations that utilize one or more resources using a user interface, such as GUI 300. In some configurations, the permission service 130 may automatically assign new users (e.g., a new hire) based on the identified role of the user 122. In this way, the new hire does not need to wait for another user 122 to configure permissions for them to begin performing the operations of their job.

According to some examples, the GUI 300 may also include UI elements that allow an authorized user to delegate approval responsibilities to other users, such as users that are at a lower security level. For instance, a manager that is globally authorized may delegate responsibilities to a national administrator, a regional administrator, a site administrator, and the like. The GUI 300, or some other UI, or interaction with the permission service 130 may also be used to search for and bulk edit users through attribute-based filtering. Additionally, the permission service 130 may include reporting and auditing capabilities that allows authorized users to run reports for auditing and compliance needs.

In the example illustrated in FIG. 3A, GUI 300 shows user interface (UI) elements that may be utilized to specify operations associated with roles. More or fewer UI elements may be included within GUI 300. As illustrated, the GUI 300 includes configuration section 302 that shows the operations that a user 122 may configure for a role. In the current example, the configuration section 302 shows a security guard role 302A UI element, a guard manager role 302B UI element, and other roles 302C UI element. In other examples, the GUI 300 may include UI elements to add roles, delete roles, and the like depending on the role associated with the user. For instance, a global manager may be associated with a role that authorizes them to perform additional operations.

According to some configurations, when the user 122B, or some other authorized user 122, selects the guard manager role UI element 302B, GUI 300 is updated to display operations 304 that are associated with the guard manager role (e.g., view video feeds, view door alarms, view power outages, perform management tasks, and the like). In the current example, the add operation UI element 306A may be selected by the user 122 to add an operation to the operations 304 associated with the guard manager role. For example, upon selecting the add operation UI element 306A, the user 122 may enter an operation by selecting the operation from available operations, entering a name of the operation within a text box, or using some other mechanism. The user 122 may edit one or more of the operations by selecting the edit action UI element 306B. For example, the user 122 may select the edit operation UE element 306B to change one or more permissions associated with the operation. For example, the user 122 may determine to remove a particular operation associated with the alarms (e.g., remove the operation to view power outages), add the operation that allows the user to adjust cameras, and the like. The user 122 may delete one or more of the operations 304 using delete operation UI element 308C. For example, the user 122 may select the delete operation UE element 306C and then highlight one of the operations within the GUI 300 to delete. The user 122 may save the configuration of the role by selecting the save UI element 312. In some examples, selecting the save UI element 312 saves the operations and identifying data within permission data 152 within the data store 150.

Figure 3B:
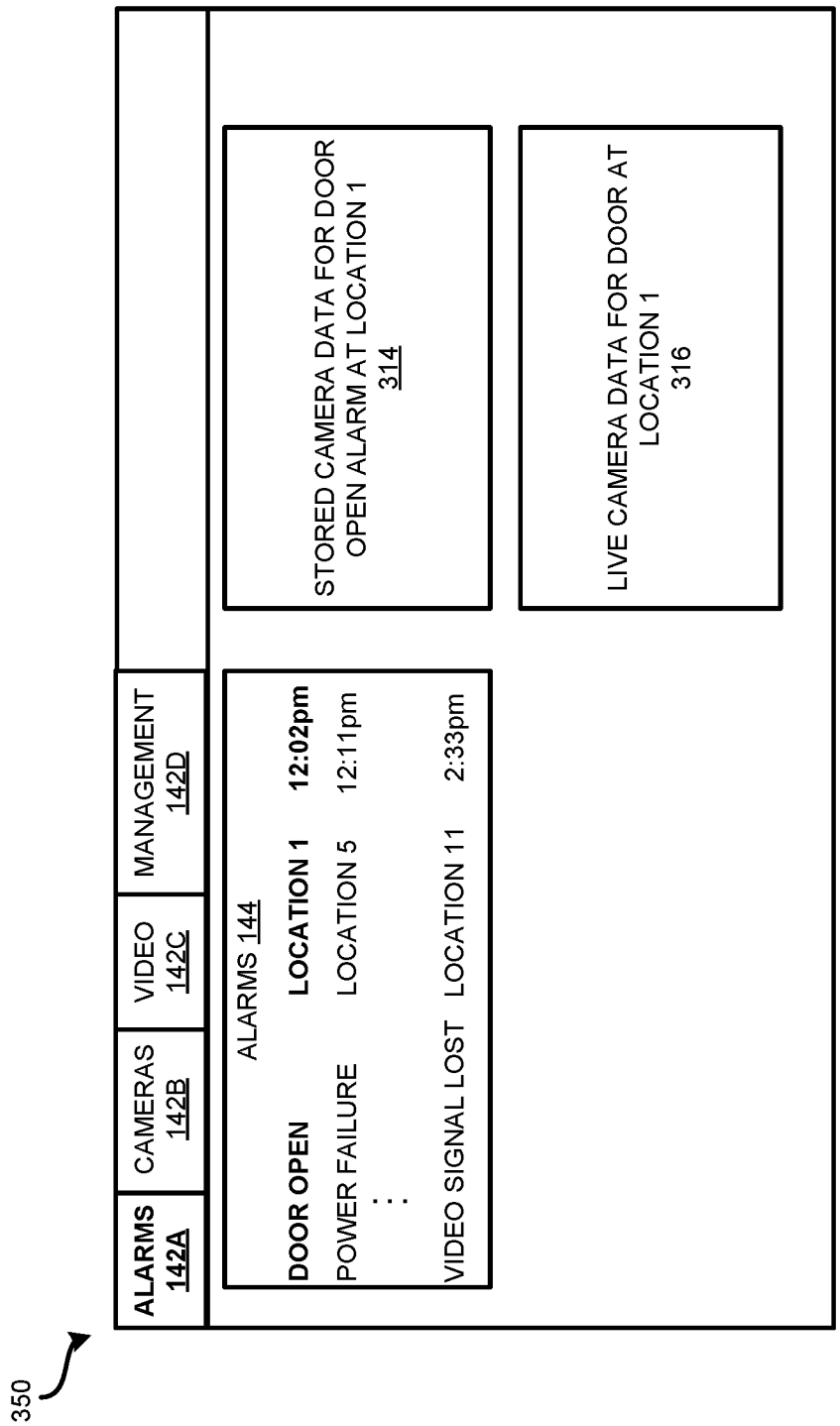
FIG. 3B is a block diagram showing an illustrative graphical user interface that may be utilized by a user of a distributed system to view data associated with resources the user is authorized to access.

FIG. 3B is a block diagram showing an illustrative graphical user interface that may be utilized by a user of a distributed system to view data associated with resources the user is authorized to access.

In the example illustrated in FIG. 3B, GUI 350 shows user interface (UI) elements related to viewing data associated with resources that a user 122, such as user 122A is authorized to access. As discussed above, in some examples, the permission service 130 is configured to restrict the data presented to a user 122 based on resources that the user 122 is authorized to access. In this way, the user 122 may readily determine what actions they can/cannot perform. More or fewer UI elements may be included within GUI 350.

As illustrated, the user 122A is viewing GUI 350 that includes a display of UI elements related to the selected alarms UI element 142A. In the current example, upon selection of the alarms UI element 142A, the request is provided to the permission service 130 to determine the resources that the user 122A is authorized to access. Upon identifying the authorized resources, the permission service 130, or some other component, generates the UI elements to include within the GUI 350. As shown, the UI elements include an alarms UI element 144 that provides data about alarms that have occurred that are related to the authorized resources and the scope that the user is associated with. The UI elements also include camera display UI element 314 that shows camera data at a particular point in time (e.g., a time when the alarm triggered) for an alarm, such as the "door open" alarm (bolded) and live camera data for the camera. Other UI elements may be included depending on the resources, the role(s) associated with the user 122, and any specified scope.

Figure 4:
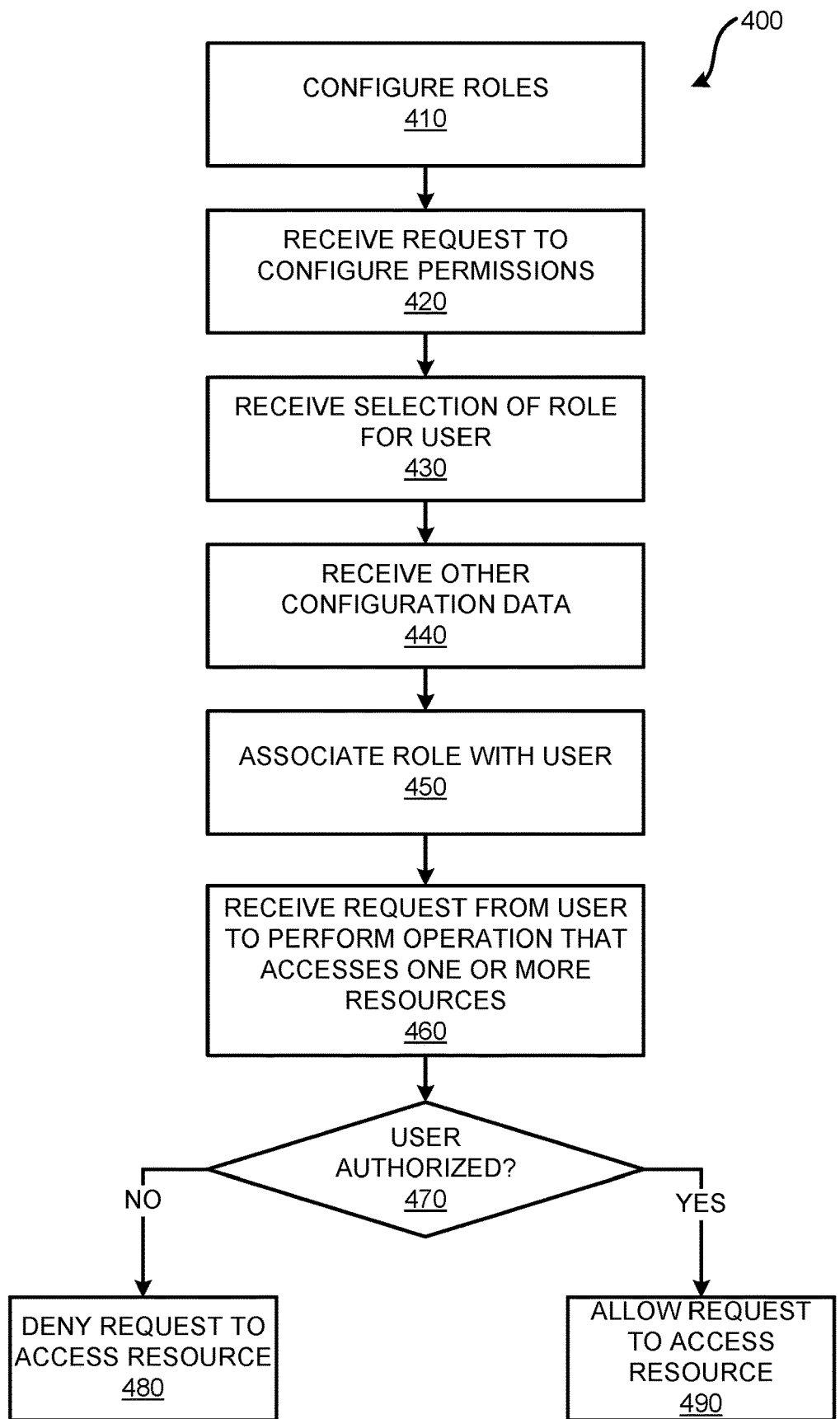
FIG. 4 is a flow diagram showing an illustrative routine for dynamic authorization of users for distributed systems.
Figure 5:
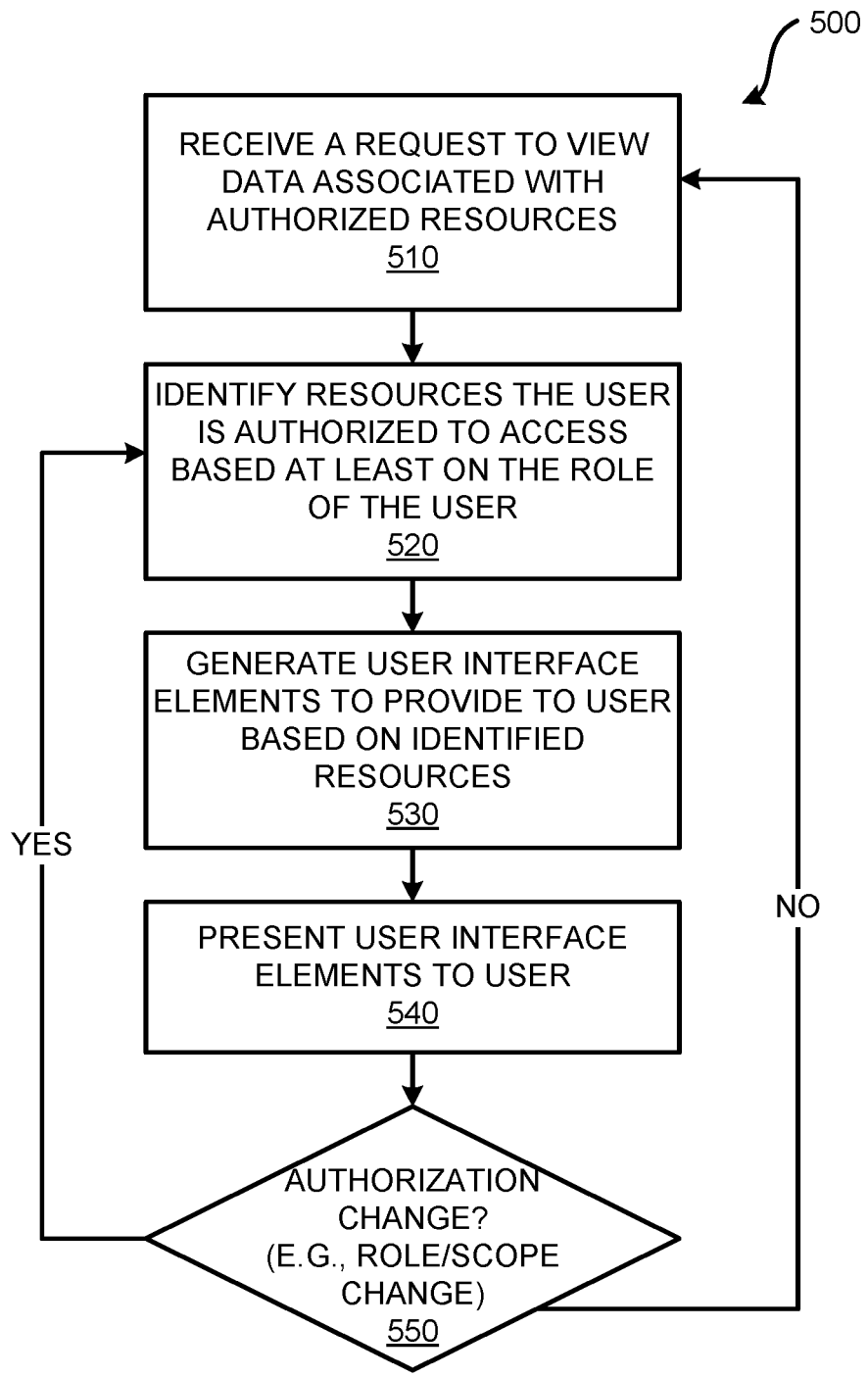
FIG. 5 is a flow diagram showing an illustrative routine for dynamically updating a user interface in response to a determination of resources a user is authorized to access.

FIGS. 4 and 5 are flow diagrams showing illustrative routines 400 and 500, respectively, for generating resources in a secured network, according to examples disclosed herein. It should be appreciated that the logical operations described herein with respect to FIG. 4, FIG. 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine 400 for dynamic authorization of users for distributed systems. At 410, roles are configured. As discussed above, authorized users 122 may configure roles that may be associated with users. In some examples, the permission service 130 uses the role(s) associated with the user to determine whether the user 122 is authorized to configure one or more roles. For instance, a user 122 associated with an administer role may configure other roles for an area identified by a scope (e.g., globally, regionally, per data center, . . . ).

At 420, a request to configure permissions for a user is received. As discussed above, the permission service 130 may receive a request via an interface, such as a command line interface, a GUI, or some other interface in response to the user 122A indicating to configure the permissions of a user. In some configurations, the permission service 130 generates a GUI that includes UI elements that may be used by user 122A to select one or more roles to be associated with the user. According to some examples, the user 122A may also provide input via the UI elements to specify the scope of the permissions (e.g., globally, locally, . . . ).

At 430, a selection of a role is received. As discussed above, the permission service 130 may receive the selection of the role of a user via an API, a UI, such as a GUI illustrated in FIG. 1, FIG. 3A or 3B, or some other interface.

At 440, other configuration data may be received. As discussed above, the permission service 130 may receive configuration data identifying a scope of the permissions via an API, a UI, such as a GUI illustrated in FIG. 3A or 3B, or some other interface.

At 450, the role is associated with the user. As discussed above, the permission service 130 may perform an authorization check of the user requesting to associate the role before associating the role. In some examples, the permission service stores the association of the role, along with other configuration data within a data store 150 of the service provider network 102.

At 460, a request is received from a user to access a resource. As discussed above, and in more detail with regard to FIG. 5, the permission service 130 is configured to display resources that the user is authorized to access within a GUI.

At 470, a determination is made as to whether the user is authorized to perform the operation that accesses one or more resources. As discussed above, the permission service 130 is configured to determine whether a user is authorized to access a resource each time a request is made. In this way, if the permissions associated with a role changes that denies access to the resource, the user is not allowed to access the resource. When the user is not authorized, the routine flows to 480. When the user is authorized, the routine flows to 490.

At 480, the request to access the resource is denied. As discussed above, the permission service 130 may deny the request to access the resource and dynamically update the display of the GUI to reflect the currently authorized resources.

At 490, the request to access the resource is allowed. As discussed above, the permission service 130 allows the request to access the resource when the role and other configuration data indicates that the user is authorized.

FIG. 5 is a flow diagram showing an illustrative routine 500 for dynamically updating a user interface in response to a determination of resources a user is authorized to access. The routine 500 begins at 510, where a request to view data associated with resources of a distributed system is received from a user. As discussed above, the request may be received from a user, such as user 122B, via a user interface, such as a GUI as illustrated in FIG. 3B.

At 520, the resources that the user is authorized to access are identified. As discussed above, the permission service 130 identifies the authorized resources by accessing data indicating the one or more roles that are associated with the user 122B. In some configurations, the permission service 130 accesses a database that associates one or more roles with the user 122B and includes data that identify the resources that are associated with the role(s).

At 530, UI elements are generated to provide to the user 122B based on the identified resources. As discussed above, the permission service 130, or some other device or component, may cause UI elements to be generated for the identified resources.

At 540, the UI elements are presented to the user 122B. As discussed above, the permission service 130 may be configured to generate a GUI that includes the generated UI elements to be presented.

At 550, a determination is made as to whether there is an authorization change. As discussed above, the permission service 130 may determine that a role/scope has changed based on an event generated that indicates a role/scope has been updated. In other examples, the permission service 130 checks the role(s)/scope(s) associated with the user 122B and identifies the authorized resources each time a user 122B requests access to perform an operation that accesses a resource. When there is a role change, the routine returns to 520. When there is not a role change, the routine returns to 510, or flows to performing other operations.

As described, a permission service 130 allows authorized users to specify permissions for users of different systems, such as physical access security systems (PACS) and easier for users to interact with the authorized resources of the PACS. For example, a manager may select a role for a user 122 to specify the resources that the user is authorized to access. When the permissions/resources of a role are changed, the permission service 130 may automatically change the permissions for users that are associated with the role. An authorized user 122 may also assign a scope to a user 122 that specifies the locations of the physical resources that the user may access (e.g., a particular data center, a region, globally, . . . ). Further, instead of having to locate specific resources that the user is authorized to access, a graphical user interface (GUI) displays the authorized resources. When the resources change, the GUI is dynamically updated by the permission service 130.

Figure 6:
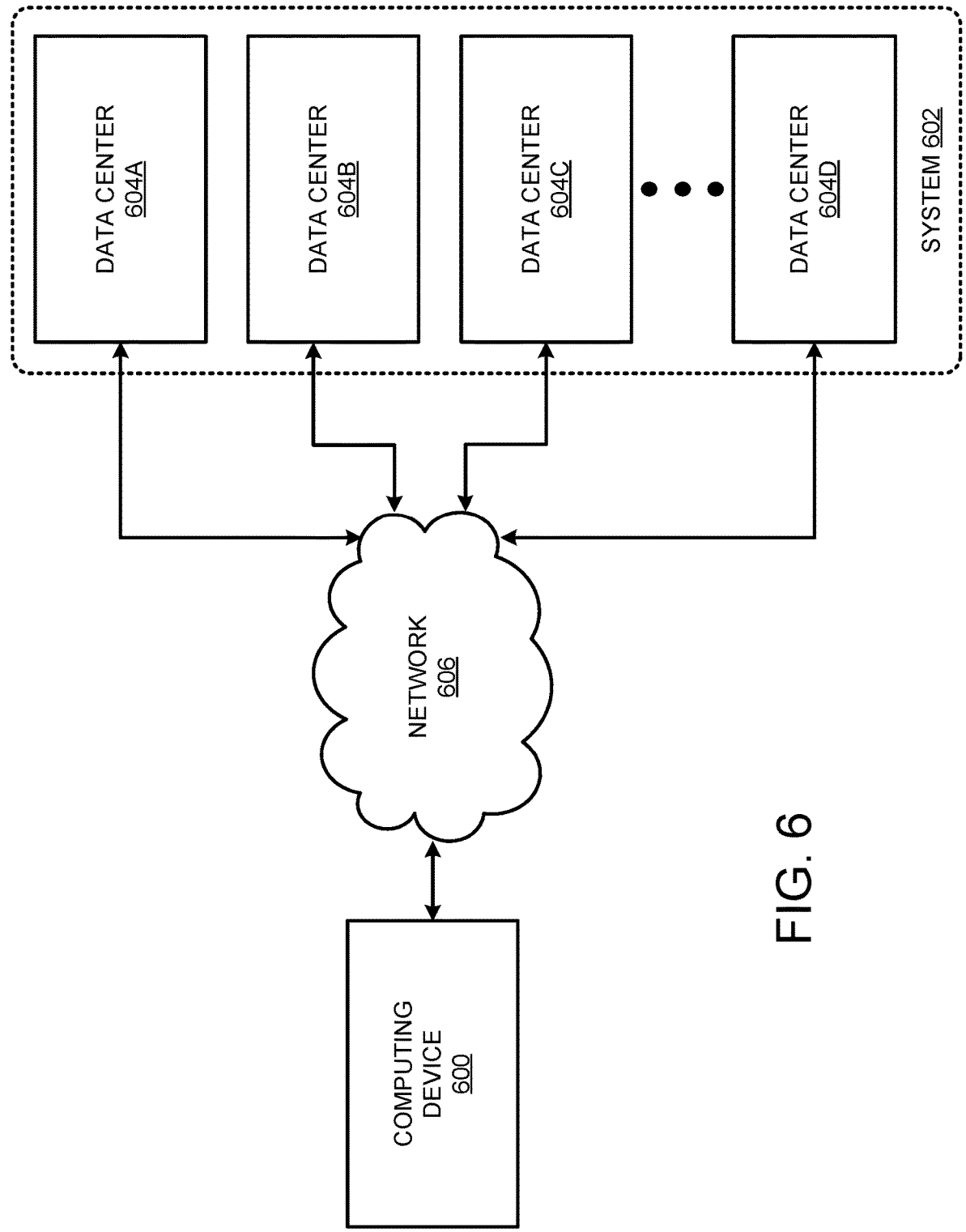
FIG. 6 is a system and network diagram that shows an illustrative operating environment including several data centers that can be configured to implement aspects of the functionality described herein.

FIG. 6 is a system and network diagram that shows an illustrative operating environment for the configurations disclosed herein that includes a system 602 that can be configured to provide the functionality described above. As discussed above, the system 602 can execute network services that provide computing resources for implementing the functionality disclosed herein. The computing resources implemented by the system 602 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The system 602 can also include and utilize other types of computing resources not mentioned specifically herein.

As also discussed above, the computing resources provided by the system 602 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 8.

The users can access the services provided by the system 602 over a network 606, which can be a wide area communication network ("WAN"), such as the Internet, an intranet or an Internet service provider ("ISP") network or a combination of such networks. For example, and without limitation, a computing device 600 operated by a user or other user of the system 602, such as the computing device 114, can be utilized to access the system 602 by way of the network 606. It should be appreciated that a local-area network ("LAN"), the Internet, or any other networking topology known in the art that connects the data centers 604 to remote users and other users can be utilized. It should also be appreciated that combinations of such networks can also be utilized.

Figure 7:
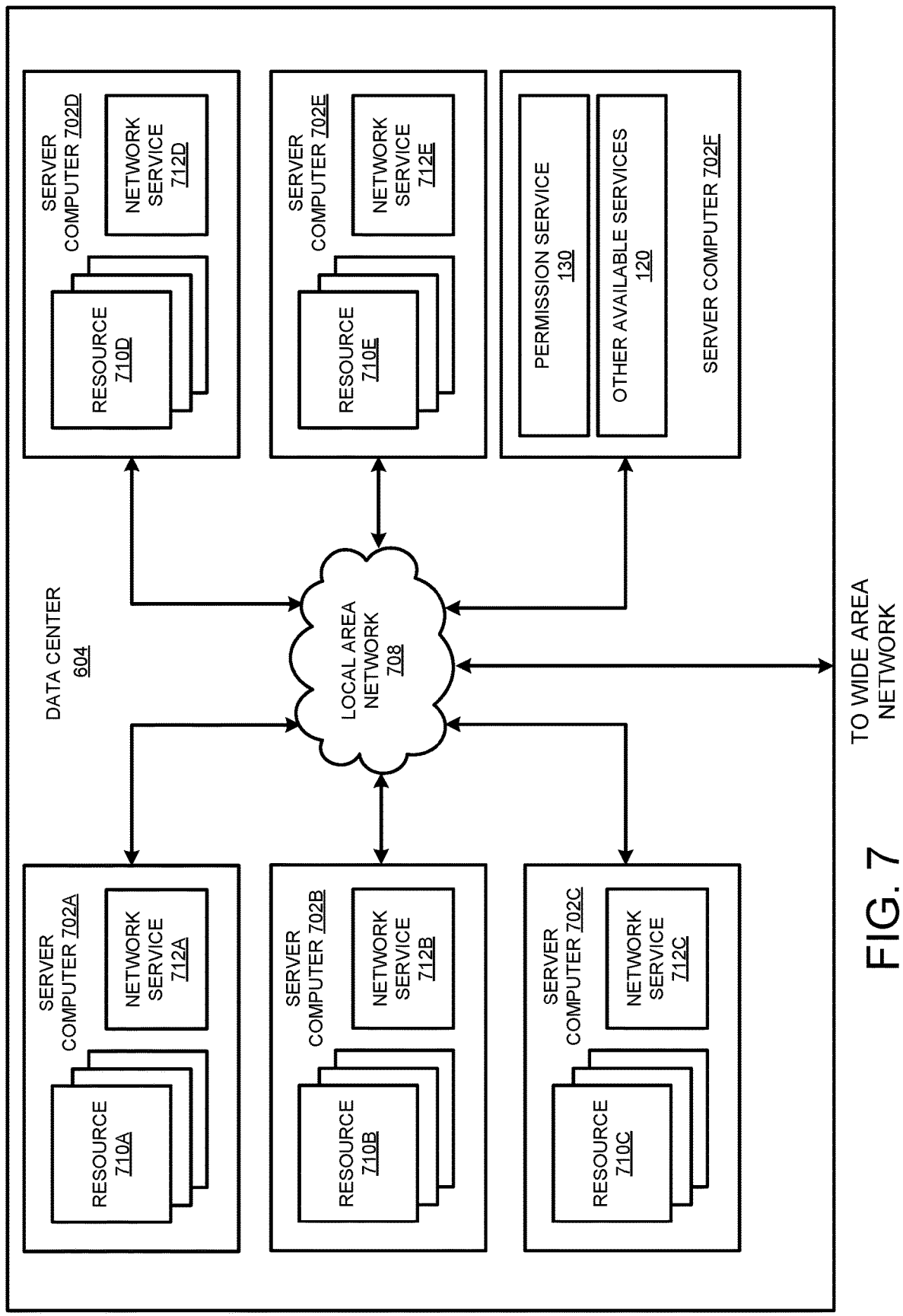
FIG. 7 is a computing system diagram illustrating a configuration for a data center that can be utilized to implement aspects of the technologies disclosed herein.

FIG. 7 is a computing system diagram that illustrates examples for a data center 604 that can be utilized to implement the permission service 130, other available services 120, and the other functionality disclosed herein. The example data center 604 shown in FIG. 7 includes several server computers 702A-702F (which might be referred to herein singularly as "a server computer 702" or in the plural as "the server computers 702").

The server computers 702 can be standard tower, rack-mount, or blade server computers configured appropriately for providing various types of computing resources 710 for implementing the functionality disclosed herein. As mentioned above, the computing resources 710 provided by the data center 604 can be data processing resources such as VM instances or hardware computing systems, data storage resources, database resources, networking resources, and others. Some of the servers 702 can also be configured to execute network services 712A-712-E, respectively, capable of instantiating, providing and/or managing the computing resources 710A-710E.

The data center 604 shown in FIG. 7 also includes a server computer 702F that can execute some or all of the software components described above. The server computer 702F can also be configured to execute other components and/or to store data for providing some or all of the functionality described herein. In this regard, it should be appreciated that components or different instances of the services can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604D, between each of the server computers 702A-702F in each data center 604, and, potentially, between computing resources 710 in each of the data centers 604. It should be appreciated that the configuration of the data center 604 described with reference to FIG. 7 is merely illustrative and that other implementations can be utilized.

Figure 8:
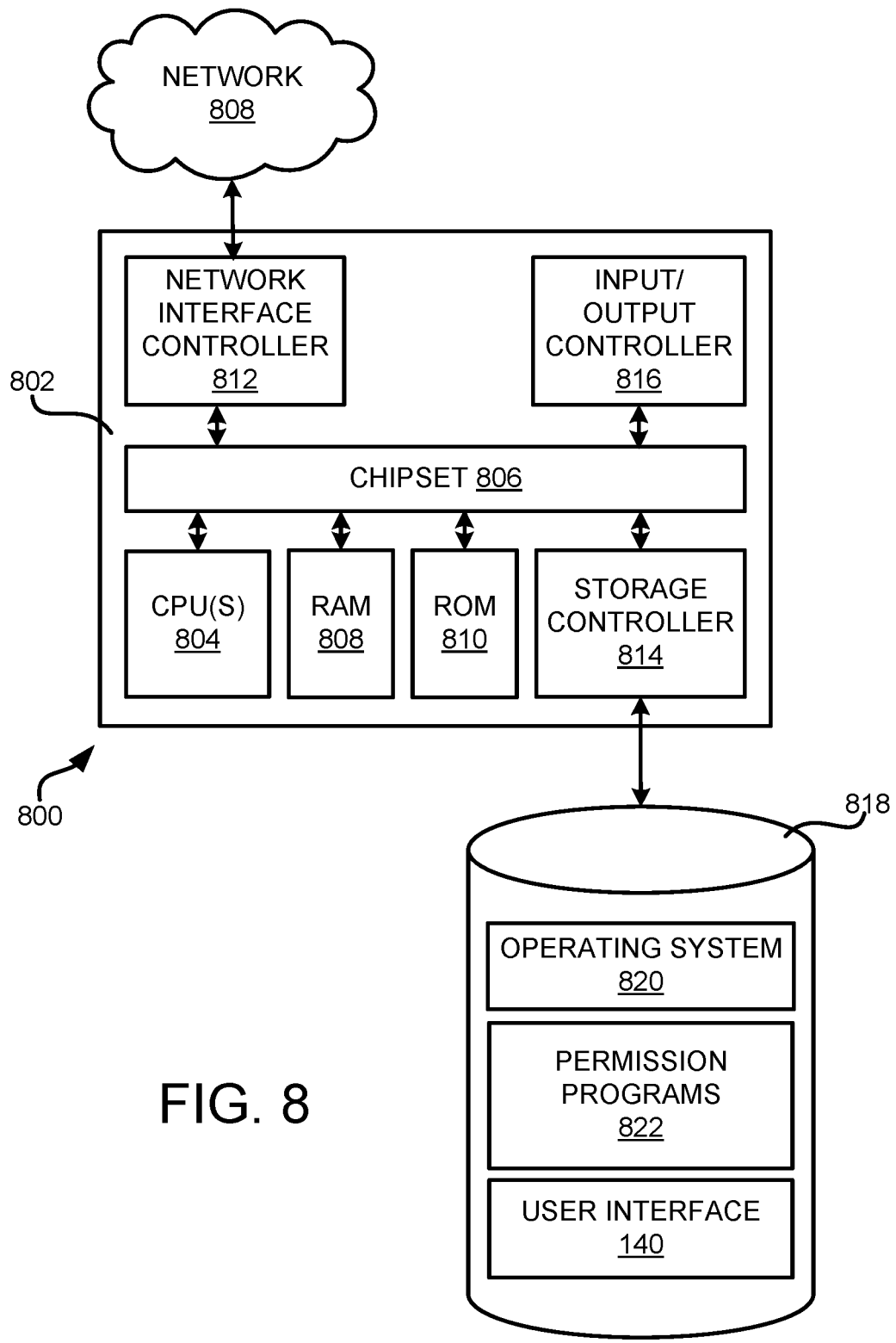
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 808. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, permission programs 822 for providing functionality associated with the network 102, user interface 140, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In examples, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to examples, the computer 800 has access to computer-readable storage media storing computer-executable instructions which, when executed by the computer 800, perform the various processes described above with regard to FIGS. 1-8. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for dynamic authorization of users for distributed systems have been described herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
a non-transitory computer-readable storage medium having instructions stored thereupon which, when executed by the one or more processors, cause the system to:
identify first resources a first user is authorized to access within different physical access security systems (PACS) based on a first role of the first user;
generate first user interface (UI) elements to present on a first display associated with the first user based on the first resources, wherein the first UI elements include one or more role UI elements associated with specifying a second role of a second user, wherein the second role specifies second resources that the second user is authorized to access within the different PACS and permissions associated with the second role;
provide for display, a first graphical user interface (GUI) that includes the first UI elements;
receive, via a role UI element of the one or more role UI elements of the first GUI, first data identifying a selection of the second role;
associate the second role and the permissions with the second user;
receive a first request from a second computing device associated with the second user to view second data associated with the second resources;
identify, based on the second role and the permissions, the second resources that the second user is authorized to access;
generate second UI elements associated with the second resources that the second user is authorized to access;
cause a second GUI, that includes the second UI elements, to be displayed on a second display associated with the second computing device;
receive a second request, via the second GUI, to access a resource of the second resources;
determine that the second user is authorized to access the resource based on the second role and the permissions;
provide, for display within the second GUI, third data associated with the resource; and
dynamically update the second UI elements displayed within the second GUI based on an updated second role of the second user, wherein the updated second role is based on determining that a first permission for the second user to physically access a new physical resource location has been added to the second role or that a second permission for the second user to physically access a physical resource location has been removed from the second role, and wherein dynamically updating the second UI elements is performed as the second user is viewing the second GUI and without receiving an additional request to access additional resources of the second resources from the second user via the second GUI.

2. The system of claim 1, wherein generating the first UI comprises generating one or more scope UI elements associated with specifying a scope that identifies one or more locations of the second resources that the second user is authorized to access.

3. The system of claim 1, wherein the instructions further cause the system to:
identify third resources a third user is authorized to access within the different PACS based on a third role of the third user;
generate third UI elements to present on a third display associated with the third user based on the third resources, wherein the third UI elements include one or more role UI elements associated with specifying a fourth role of the second user, wherein the fourth role specifies fourth resources, in addition to the second resources, that the second user is authorized to access within the different PACS;
provide for display, a third GUI that includes the third UI elements;
receive, via another role UI element of the one or more role UI elements of the third GUI, second data identifying a selection of the fourth role; and
associate the fourth role with the second user.

4. The system of claim 1, wherein dynamically updating the second UI elements comprises:
identifying third resources that the second user is authorized to access based on an updated second profile of the second user;
generating third UI elements associated with the third resources that the second user is authorized to access; and
cause the second GUI, that includes the third UI elements, to be displayed on the second display.

5. A computer-implemented method comprising:
receiving, from a computing device associated with a user, a request to view data associated with resources of one or more physical access security systems (PACS);
identifying, based at least in part on a role associated with the user, one or more resources of the resources that the user is authorized to access within at least one of the one or more PACS, wherein the role identifies the one or more resources that the user and other users associated with the role are authorized to access;

generating one or more user interface (UI) elements associated with the one or more resources that the user is authorized to access;

causing a graphical user interface (GUI), that includes the one or more UI elements, to be displayed on a display associated with the computing device;

determining that the role associated with the user changed, wherein a change associated with the role comprises at least one of determining that a first permission for the user to physically access a new physical resource location has been added to the role or that a second permission for the user to physically access a physical resource location has been removed from the role; and updating the one or more UI elements displayed within the GUI based at least in part on determining that the role associated with the user changed, wherein updating the one or more UI elements is performed as the user is viewing the GUI and without receiving an additional request to access additional resources of the one or more resources from the user via the GUI.

6. The computer-implemented method of claim 5, wherein determining that the role associated with the user changed occurs at least partly in response to receiving a second request to view second data associated with the one or more resources.

7. The computer-implemented method of claim 5, further comprising:

identifying one or more second UI elements to present on a second display associated with a second user based on a second role associated with the second user, wherein the one or more second UI elements are used by the second user to associate the role with the user, wherein the second role specifies one or more second resources that the second user is authorized to access within one or more of the PACS;

providing for display on the second display, a second graphical user interface (GUI) that includes the one or more second UI elements;

receiving, via the second GUI, second data identifying a selection of the role; and associating the role with the user.

8. The computer-implemented method of claim 5, wherein identifying the one or more resources that the user is authorized to access comprises determining a scope associated with one or more of the role and the user, wherein the scope identifies one or more locations that the user is authorized to access.

9. The computer-implemented method of claim 5, wherein identifying the one or more resources comprises accessing one or more data stores that include an identification of the user, one or more roles associated with the user, and one or more scopes associated with the one or more roles, wherein the one or more roles includes the role.

10. The computer-implemented method of claim 5, further comprising:

receiving second data identifying a selection of the role and a scope to associate with the role;

associating the role and the scope with the user;

receiving third data identifying a selection of a second role and a second scope to associate with the second role; and associating the second role and the second scope with the user.

11. The computer-implemented method of claim 5, further comprising exposing an Application Programming Interface (API) that includes functionality to interact with the resources and to associate the role with the user.

12. The computer-implemented method of claim 11, further comprising:

receiving a request, via the API, to perform an action that involves one or more of the resources; and determining that the user is authorized to access one or more resources associated with the action based at least in part on the role.

13. The computer-implemented method of claim 11, further comprising providing, for presentation within the GUI, the one or more UI elements configured to filter the one or more resources and receive one or more selections of the one or more resources filtered.

14. A system comprising:

one or more processors; and a non-transitory computer-readable storage medium having instructions stored thereupon which, when executed by the one or more processors, cause the system to:

receive, from a computing device associated with a user, a request to view data associated with resources of one or more physical access security systems (PACS);

identify, based at least in part on a role associated with the user, one or more resources of the resources that the user is authorized to access within at least one of the one or more PACS, wherein the role identifies the one or more resources that the user and other users associated with the role are authorized to access;

generate one or more user interface (UI) elements associated with the one or more resources that the user is authorized to access;

cause a graphical user interface (GUI), that includes the one or more UI elements, to be displayed on a display associated with the computing device;

determine that the role associated with the user changed, wherein a change associated with the role comprises at least one of determining that a first permission for the user to physically access a new physical resource location has been added to the role or that a second permission for the user to physically access a physical resource location has been removed from the role; and update the one or more UI elements displayed within the GUI based at least in part on determining that the role associated with the user changed, wherein updating the one or more UI elements is performed as the user is viewing the GUI and without an additional request to access additional resources of the one or more resources from the user via the GUI.

15. The system of claim 14, wherein determining that the role associated with the user changed occurs at least partly in response to receiving a second request to view the data associated with the one or more resources.

16. The system of claim 14, wherein the instructions further cause the system to:

identify one or more second UI elements to present on a second display associated with a second user based on a second role of the second user, wherein the second UI elements are used by the second user to associate the role with the user, wherein the second role specifies second resources that the second user is authorized to access;

provide for display on the second display, a second graphical user interface (GUI) that includes the one or more second UI elements;

receive, via the second GUI, data identifying a selection of the role; and associate the role with the user.

17. The system of claim 14, wherein identifying the one or more resources that the user is authorized to access comprises determining a scope associated with one or more of the role and the user, wherein the scope identifies one or more locations that the user is authorized to access.

18. The system of claim 14, wherein the one or more PACS includes a camera service, an alarm service, and an access management service.

19. The system of claim 14, wherein the instructions further cause the system to expose an Application Programming Interface (API) that includes functionality to interact with the resources and associate roles with users.

20. The system of claim 14, wherein the instructions further cause the system to provide, for presentation within the GUI, the one or more UI elements configured to filter the one or more resources and receive one or more selections of the one or more resources filtered.

\* \* \* \* \*